US008332261B2

(12) United States Patent
Gillam et al.

(10) Patent No.: US 8,332,261 B2
(45) Date of Patent: Dec. 11, 2012

(54) METHOD, SYSTEM AND APPARATUS FOR EVALUATION OF EMPLOYEE COMPETENCIES USING A COMPRESSION/ACCELERATION METHODOLOGY

(75) Inventors: Andrew R. Gillam, Spicewood, TX (US); William Guy Hilbert, Atlanta, GA (US)

(73) Assignee: Oracle International Corporation, Redwood Shores, CA (US)

( * ) Notice: Subject to any disclaimer, the term of this patent is extended or adjusted under 35 U.S.C. 154(b) by 627 days.

(21) Appl. No.: 12/475,118

(22) Filed: May 29, 2009

(65) Prior Publication Data

US 2010/0306036 A1    Dec. 2, 2010

(51) Int. Cl.
*G06Q 10/00* (2012.01)
(52) U.S. Cl. ..................................... 705/7.38
(58) Field of Classification Search .................. 705/7.38
See application file for complete search history.

(56) References Cited

U.S. PATENT DOCUMENTS

| | | | |
|---|---|---|---|
| 6,338,042 B1 * | 1/2002 | Paizis ........................... | 705/7.37 |
| 6,754,874 B1 * | 6/2004 | Richman ...................... | 715/205 |
| 7,184,969 B1 * | 2/2007 | Bonnstetter et al. .......... | 705/7.14 |
| 7,668,746 B2 * | 2/2010 | Eisma et al. .................. | 705/7.14 |
| 7,958,001 B2 * | 6/2011 | Abbadessa et al. ........... | 705/7.38 |
| 2004/0224296 A1 * | 11/2004 | Carraccio ..................... | 434/322 |
| 2009/0319344 A1 * | 12/2009 | Tepper et al. .................. | 705/11 |

OTHER PUBLICATIONS

Parry, Scott B. Just What is a Competency? (and why should you care?) Training the Human Side of Business. Jun. 1998.*
Klein, Andrew L. Validty and reliabilty for competency-based systems: Reducing litigation risks, global computer network download printout, Copyright 1998, Infonautics Corporation.*
Factsheet, DDI Development Dimensions International, Leadership Development Through Assessment Centers, copyright 1993, 2 pages.*
Schoonover, Stephen C. Competencies for the year 2000. IA professional's Toolkit for Performance Development, the Schoonover Group, Cover page, inside cover page, p. 1 with copyright notice of 1998.*
SkillScape, overview of Skillscape Competency Manager. no date available.*

* cited by examiner

*Primary Examiner* — Johnna Loftis
(74) *Attorney, Agent, or Firm* — Campbell Stephenson LLP (57) ABSTRACT

A mechanism to evaluate the value of employee competencies across a business entity is provided. Managers provide raw interpretations of employee competencies in a variety of selected competency areas. The raw evaluations of employee competencies are weighted and stored according to an organizational utility of each competency to the business entity, arriving at an adjusted competency value for each competency. Depth of an employee's competency in a particular area is evaluated by selecting the highest adjusted competency value for an employee and then compressing that highest adjusted competency value in order to level initial assessments of an employee's strongest skill. This compressed value is augmented by one or more accelerators based upon the assessments of the employee's other competencies. The result is an overall domain competency rating for the employee that can then be used for comparison against other employees in the business entity.

20 Claims, 6 Drawing Sheets

| Competency 310 | Competency Impact 320 | Impact Weighting 330 |
|---|---|---|
| Analytical Intelligence | 1 | 1.0 |
| Assortment Planning | 2 | .90 |
| Location Planning | 2 | .90 |
| Design | 4 | .40 |
| Web Track | 3 | .80 |
| Tools | 3 | .80 |

Organizational Utilities Table 260

Figure 3

| Employee ID 410 | Competency 1 420(1) | Competency 2 420(2) | ... | Competency N 420(N) |
|---|---|---|---|---|
| Employee 1 | 3 | 0 | | 5 |
| Employee 2 | 2 | 4 | | 1 |
| Employee 3 | 5 | 0 | | 0 |
| Employee 4 | 3 | 3 | | 3 |
| ... | | | | |
| Employee M | 2 | 4 | | 1 |

Employee Competencies Table 265

Figure 4

| Competency Level 510 | Accelerator 520 |
|---|---|
| 1 | 0.0 |
| 2 | 0.065 |
| 3 | 0.07 |
| 4 | 0.1 |
| 5 | 0.125 |

Accelerators Table 270

METHOD, SYSTEM AND APPARATUS FOR EVALUATION OF EMPLOYEE COMPETENCIES USING A COMPRESSION/ACCELERATION METHODOLOGY

FIELD OF THE INVENTION

The present invention relates to the field of employee management and, specifically, to a means for performing a competency evaluation for employees of an organization.

BACKGROUND OF THE INVENTION

Business entities of any size employ and manage employees of varying value to the business entity due to varying skill levels in core competency areas. Over the course of time, a business entity makes decisions regarding the hiring, firing, training, and promotion of the entity's employees. Such decisions are made in light of assessments and reviews of employee skills and value to the business entity. In part, that determination is based upon an evaluation of employee competencies.

Consistent evaluation of employee competencies can be a challenging process in every business entity. As a business entity grows, management of employees may be handled by more than one manager, and more than one level of management. In order to appropriately evaluate each employee no matter who their manager is, a mechanism for tracking and consistently evaluating management impressions of employee competency across the enterprise is desirable. Accurate and reliable assessments of competencies across the business entity can, for example, mitigate attrition risks and enhance productivity. Evaluations should recognize the value of skills to a business entity while at the same time fairly assessing highly-focused experts in a particular competency area in comparison to those with broad abilities. In technology-related disciplines, for example, a long standing issue has been consistent valuation of depth in a specific competency area versus a breadth of knowledge in a variety of disciplines.

It is therefore desirable to have a tool that aids managers of employees in their evaluation and analysis of employee competencies. It is desirable that such a tool provide a mechanism for consistent valuation of competencies across a business entity.

SUMMARY OF THE INVENTION

Embodiments of the present invention provide a mechanism to consistently evaluate the value of employee competencies to a business entity across the business entity. Embodiment of the present invention provide such functionality by determining a highest competency value from a set of competencies associated with an identifier of a member of a business entity, compressing the highest competency value, generating an accelerator multiplier for the highest competency value from one or more values of remaining competencies of the set of competencies, and generating an overall domain competency value by multiplying the compressed highest competency value by the accelerator multiplier. Embodiments of the present invention further provide that each competency value is on a competency scale from a minimum competency value to a maximum competency value and the identifier of the member of the business entity is stored as an entry of a first table. Embodiments of the present invention also provide that the compressing of the highest competency value maps the highest competency value to an adjusted competency scale.

Aspects of embodiments of the present invention provide for the set of competencies being generated by receiving one or more raw competency values for corresponding competencies in the set of competencies, weighting each competency value according to an organizational utility value for the competency, and storing each weighted competency value in the first table entry. Another aspect of embodiments of the present invention provides for storing entries comprising identifiers of each competency with associated organizational utility values in a second table. A further aspect of embodiments of the present invention provides for performing the compressing the highest competency value by using a mapping such that the adjusted scale has a reduced maximum competency value wherein the mapping comprises one of a lookup table and a formula-based curve.

Another aspect of the present invention provides for generating the accelerator multiplier for the highest competency value by determining an accelerator value associated with a competency value of the competency and adding the accelerator value to a sum of accelerator values for each other remaining competency in the set of competencies. A further aspect of embodiments of the present invention provides for determining the accelerator value associated with a competency value of the competency by comparing the competency value with competency values stored in a table storing competency values and associated accelerator values and using the accelerator value associated with a matching competency value stored in the table storing competency values.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

DETAILED DESCRIPTION

Embodiments of the present invention provide a mechanism to consistently evaluate the value of employee competencies to a business entity across the business entity. Embodiments of the present invention perform such a task by first mandating employee managers use a strict scale to provide raw interpretations of employee competencies in a variety of selected competency areas. The raw evaluations of employee competencies are stored in a database and then weighted according to a predetermined value of each competency to the business entity ("organizational utility") to arrive at an adjusted competency value for each competency. A depth of an employee's competency in a particular area is then taken into account by selecting the highest adjusted competency value for an employee and then compressing that highest adjusted competency value in order to avoid over-evaluation at the high end of the employee evaluation spectrum and to level initial assessments of an employee's strongest skill. This compressed value is then augmented by one or more accelerators, the values of which are based upon the assessments of the employee's other competencies. The result is an overall domain competency rating for the employee that can then be used in the value's current form or in a normalized form for comparison against other employees in the business entity for a variety of purposes.

Invention Concepts

People use a variety of skills to perform at different levels while fulfilling professional, job-related tasks. A variety of methods historically have been used to address problems related to fitting skills to staffing models and maximizing staffing models. Assessment models can rely on interviews, score cards and other approaches to rate individuals, for example, on a scale from 1-5 in terms of their overall performance. These ratings and models can then be used to make personnel-related decisions.

In certain areas, issues arise when evaluating employee competencies. For example, when assessing technical skills, issues arise when comparing what is referred to as "depth-versus-breadth" competencies of employees. Such depth-versus-breadth comparisons are difficult, as they involve assessing relative worth to a business entity of highly-specialized individuals with a deep set of knowledge in a particular area (e.g., people who can solve a specific set of issues with a high degree of skill) and those who are less specialized but nonetheless have a strong set of skills in a variety of areas. The highly specialized individuals are indispensable, but perhaps only a small percentage of their time may be billed to client initiatives over the span of a year. On the other hand, those with a wider set of skills may be able to bill a substantial percentage of their time over the course of a year, due to their ability to assess a variety of situations, evaluate the issues and implement solutions to those issues. Nonetheless, those people with the wider-but-shallower set of skills are reliant upon the highly-skilled individuals for those problems that are substantially outside the box. Evaluating which of those individuals in a group deserves higher compensation, promotion, or who should be retained or laid off are dependent upon those individuals' relative value to the business entity. Traditional employee evaluation tools fail to provide an adequate analysis of this depth-versus-breadth issue.

In order to solve the depth-versus-breadth issue in employee evaluations, embodiments of the present invention quantify and evaluate both depth of skill and the breadth of skills for each employee. A consistent assessment of an employee's ability, background and experience across many competencies of significance to the business entity is acquired. Identification can then be made of the employee's level of ability in the employee's strongest competency. An additional criterion that can be taken into account is organizational utility, which is the applicability of each competency to the business focus of the business entity (e.g., a group, a division, or the entire business entity).

Embodiments of the present invention can implement organizational utility evaluations by using a set of predetermined competencies that are of concern to the business entity being evaluated. Once this set of competencies is determined, a relative weighting of the importance of each competency can then also be made, thus providing an "organizational utility" for each competency. Each employee in the business unit can then be evaluated according to a set of strict criteria for each competency. Such an evaluation can provide a raw scalar value (e.g., 1-5) for the employee's strength in that particular competency. The raw scalar values for competency level can then be adjusted for the organizational utility weighting to arrive at an adjusted competency value for each competency of concern. Embodiments of the present invention can then use a compression formula to map the adjusted competency value of the employee's strongest weighted competency into a smaller range than the original input domain to arrive at a compressed strongest competency value. Details related to this compression are discussed below. Then, embodiments of the present invention use the employee's strength on the remaining competencies to generate an accelerator value that is used as a multiplier to the compressed strongest competency value. The result for each employee is an overall domain competency value that is an aggregate of all the competencies for a particular individual, emphasizing the strongest competency (depth) while taking into account the employee's strength in other competencies (breadth).

As stated above, each employee is evaluated for their level of skill in each competency of interest to the business entity. In order for a fair evaluation of each employee across a variety of business groups having a variety of managers performing the evaluation, a set of rigorous criteria for each numerical level of skill should be used. An example of such criteria used for evaluating technical competencies in one or more products, applications or tools is as follows:

Level 1—The employee demonstrates knowledge of a product, application or tool but possesses no practical experience using the product, application or tool in a commercial environment to achieve measurable outcomes.

Level 2—The employee demonstrates knowledge of the product, application or tool and possesses some success achieving measurable outcomes via practical experience with the product, application or tool in a commercial environment.

Level 3—The employee demonstrates knowledge indicating self-sufficiency in a majority of cases calling for use of the product, application or tool. The phrase "self-sufficiency" shall be validated via sustained measurable outcomes using the product, application or tool in multiple commercial environments.

Level 4—The employee demonstrates knowledge indicating self-sufficiency in all cases calling for use of the product, application or tool. The employee has sustained measurable outcomes using the product, application or tool in multiple commercial environments. The employee mentors others at Level 3 and below in special cases or pertaining to challenges associated with using the product, application or tool in commercial environments.

Level 5—The employee is an expert in the use of the product, application or tool, and champions its use in a business context. The employee mentors others in specialized areas pertaining to the product, application or tool. The employee successfully fulfills an expert role with peers and customers in activities relating to the product, application or tool, and demonstrates innovative behaviors using or improving the product, application or tool.

The above list should serve as an example of a set of strict criteria that can be used in order to evaluate employee competencies for a business unit. Criteria for specific business units may vary depending upon the needs and related competencies for that business unit. Nonetheless, once a set of strict criteria are achieved, managers should be encouraged and trained to use that set of criteria in a consistent manner across the business entity. Thus, the set of criteria should be selected so that they can be used in a consistent manner.

In addition to strictly evaluating individual employee's levels of skill for each competency, each competency should be evaluated in order to determine the value of that competency to the business entity. In other words, experts in particular areas may be valued differently by a business entity despite having roughly equivalent skills within their respective areas. For example, efforts from each expert may contribute substantial, but varied amounts of revenue to the organization. The impact of these competencies should be evaluated in light of the business entity's need; this is called organizational utility.

For example, there may be two employees in which the first is productive in areas that are called for regularly in a large percentage of the business's consulting engagements, while the second is productive in areas that are called for less often and in a smaller percentage of circumstances. Valuation of their relative competencies should account for such differences in organizational utility and yet still recognize the strengths of each employee in their respective areas.

Implementing a solution for organizational utility depends on an ability to classify the set of competencies by their value to the business entity. Each classification can be assigned a numeric weighting for calculation. An example of such classifications for technical competencies is as follows:

Highest Impact (100% weighting)—Knowledge in the product, application or tool space is of greatest benefit to the organization (e.g., flagship areas).

Moderate Impact (90% weighting)—Knowledge in this product, application or tool space is of moderate benefit to the organization (e.g., important supporting areas).

Low Impact (80% weighting)—Knowledge in this product, application or tool space is of low benefit to the organization (e.g., contributing areas).

Negligible Impact (40% weighting)—Knowledge in this product, application or tool space is of negligible benefit to the organization (e.g., defunct or end-of-life products, applications or tools that may still have some benefit in occasional circumstances).

This list of classifications for various competencies is merely an example. Different business entities may desire a larger number of weighting classifications, or different levels of weighting to differentiate the relative value of competencies to the organization.

Once employees have been evaluated and the various competencies have been weighted, embodiments of the present invention provide a mechanism to aggregate this information to provide an overall domain competency level for each employee. In order to appropriately model managerial expectations for the behavior of domain competencies, embodiments of the present invention use a compression and acceleration approach.

One reason for performing compression of raw competency values is due to professional employees (e.g., technical professionals) potentially possessing a variety of skills and abilities. Multiple people may possess comparable levels of skill in their strongest areas (e.g., all of them "wizards" in their respective area) and also be augmented by one or more ancillary skillsets. Blindly classifying one of these people as an "expert" diminishes the value of the ancillary skills, which ultimately can invalidate any scalar rating used to reflect the depth of the individual skill. Compression can be used to "level" the initial assessment of an individual's strongest skill and allow for the application of additional considerations for ancillary skills.

Compression is performed by determining the value for the highest weighted competency for an employee. That value is then compressed from the raw scale (e.g., 1-5) to a compressed scale that decreases values at the top of the scale. Such an approach adjusts for particularly high ratings of employees' competencies. Further, by decreasing the values for competencies at the high end, a calculated overall domain competency can still be reflected in the original scale (e.g., 1-5).

Figure 1:
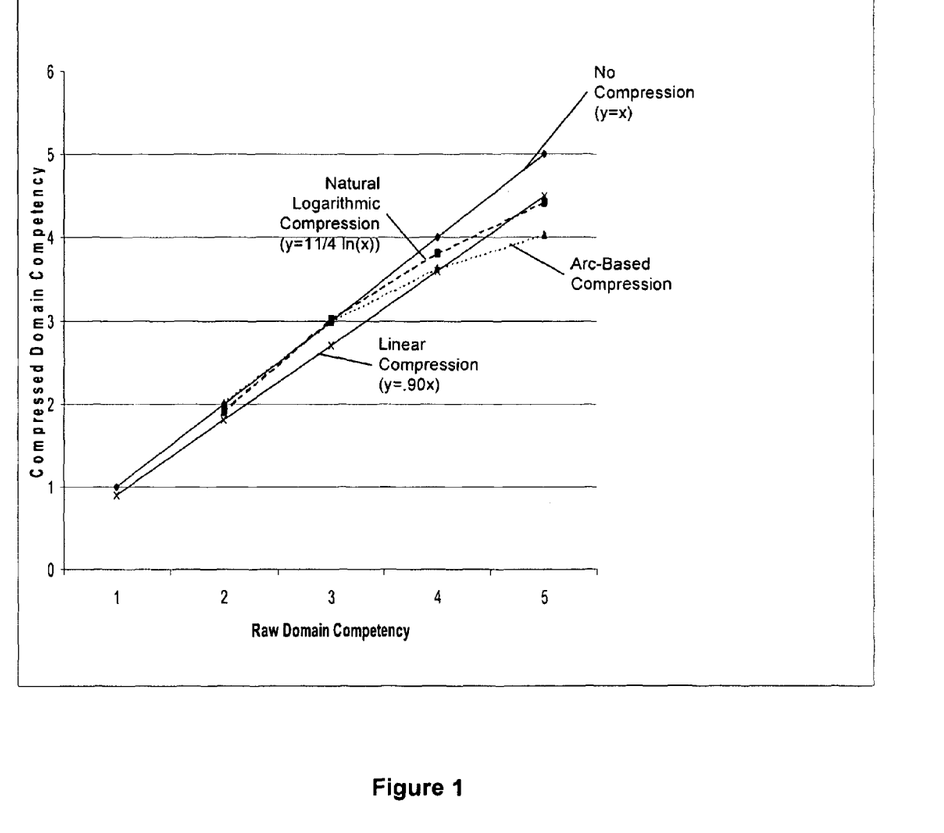
FIG. 1 is a chart illustrating a variety of compression curves usable by embodiments of the present invention.

FIG. 1 is a chart illustrating a variety of compression curves usable by embodiments of the present invention. One approach is a linear compression in which the top end compressed value is 4.5 and each other competency value is reduced along a straight line from 1-4.5, ($y=0.90x$). A downside to such a linear compression approach is that a person compressed to Level 4 would need to acquire at least three additional Level 4 competencies before a cross-over could occur to level 5. In certain environments, this can be too stringent a requirement.

An alternative approach is a natural logarithmic compression that provides for curving away from raw values (x) as competency levels increase. The illustrated natural logarithmic compression curve is defined by $y=(11)/4 \ln(x)$. Such a curve coincides with roughly a linear curve ($y=x$) $x \leq 3$ and curves away for $x>3$. A drawback of this curve is that the curve does not fully address a situation where a person with strong competencies (e.g., a highest competency of a Level 4) would be able to cross-over to a Level 5 overall domain competency without possessing three additional Level 4 competencies. Again, this may be too stringent a requirement in certain business environments.

Another compression approach is derived from a decision that 5's should be compressed to 4's and 4's should be compressed to approximately 3.5, while maintaining a linear relationship along the lower level competencies. This arc compression curve is defined by a circle described by the equation: $(x-6.7)^2+(y+1.725)^2=36$. Thus, an equation for the arc compression line is $y=\mathrm{sqrt}(36-(x-6.7)^2)-1.725$. Such an arc compression exhibits a greater difference from the raw values of 4 and 5 than natural logarithmic compression provides, resulting in a tighter compression for $x=5$ and an application of two additional Level 4 competencies for a cross-over from Level 4 to Level 5 overall domain competency to occur. One embodiment of the present invention uses such an arc-based compression.

As discussed above, accounting for the depth-versus-breadth issue is accomplished by not only using a compression, but also an acceleration that is based upon the additional competency values. Acceleration can allow a person at a particular skill level evaluated for their primary competency to "cross over" to a higher overall domain competency. Accelerators can be determined by a business entity to allow greater or lesser impact of additional competencies, depending upon the specifics for that business entity. Through the use of accelerators, multi-competency employees may, in some cases, rate higher than experts in isolated areas if the employee possesses enough competencies. The number of accelerators required for such a cross over to occur is based upon the employee's competency rating in their highest rated area and the nature of the compression used for the highest weighted competency. For example, a number of competencies that induce a cross-over can halve at each increasing competency level. Thus, for an employee at Level k, a number of accelerators required to initiate a cross-over is $2^{(5-k)}$. An example of acceleration values that can be applied to additional competencies when accelerating an arc-compressed primary competency in such a manner are as follows:

Level 5=12.5% (e.g., multiply compressed strongest competency by 1.125)
Level 4=10% (e.g., multiply compressed strongest competency by 1.10)
Level 3=7.0% (e.g., multiply compressed strongest competency by 1.07)
Level 2=6.5% (e.g., multiply compressed strongest competency by 1.065)
Level 1=0% (e.g., multiply compressed strongest competency by 1.00)

While the above list of acceleration values has been effective for embodiments of the present invention, it should be recognized that embodiments of the present invention are not limited to the use of any particular acceleration scale. Further, as discussed above, an acceleration scale can be determined in an appropriate manner for a particular business entity and chosen compression algorithm. Accelerator values may be derived by methods that vary by industry or organization. A method for calculating accelerator values can be based on the following for models using raw competency levels in the range 0-N:

Target a number, m, of additional competencies desired for an individual with a highest competency level of N-1 to cross-over the compressed value for an individual with a single competency of Level N;
Determine an intermediate value, z, by multiplying the difference between compressed values of Level N and Level N-1 by the quotient of m divided by (N-1) (e.g., z=(Compressed[N]−Compressed[N-1])*(m/(N-1)));
Divide z by (N-1) to obtain a value, p; and
For each Level, i, where i≦N, assign a value p*i as the accelerator.

Accelerators for several competencies can be used by taking the sum of each accelerator percentage value and then adding 1 to that sum and multiplying that value by the compressed highest rated competency value. The result is an overall domain competency value for the individual. Thus, a person's compressed strongest competency value is increased through the use of the secondary competency values taken as an aggregate multiplier. Thus, not only is an employee's depth of knowledge taken into account through the use of the weighted primary competency, but also their breadth of knowledge and competencies through the use of the secondary competencies as accelerators. The relative value of the secondary competencies can be adjusted to the needs of the business entity by both the choice of a compression curve for the strongest competency (thereby affecting the levels of secondary competencies necessary for cross-over) and the accelerator values chosen for each competency level of the secondary competencies (also affecting cross-over sensitivity).

In alternative environments, a business entity may not be as concerned about accounting for breadth of an employee's knowledge or skill (e.g., the ability of a technical service employee to handle different billable scenarios for clients). Instead, the business entity may prize depth of skill more and would be less concerned about enabling crossover from a lower domain competency level to a higher domain competency level through accelerators (e.g., a research and design environment calling for inventive brilliance of employees). In such an environment, a business entity can modify the compression curve to reflect the value of the depth of skill and to make results of a compression mapping less sensitive to accelerators. In addition, the business entity can lower accelerator values to make crossovers more difficult to achieve.

Implementation

Figure 2:
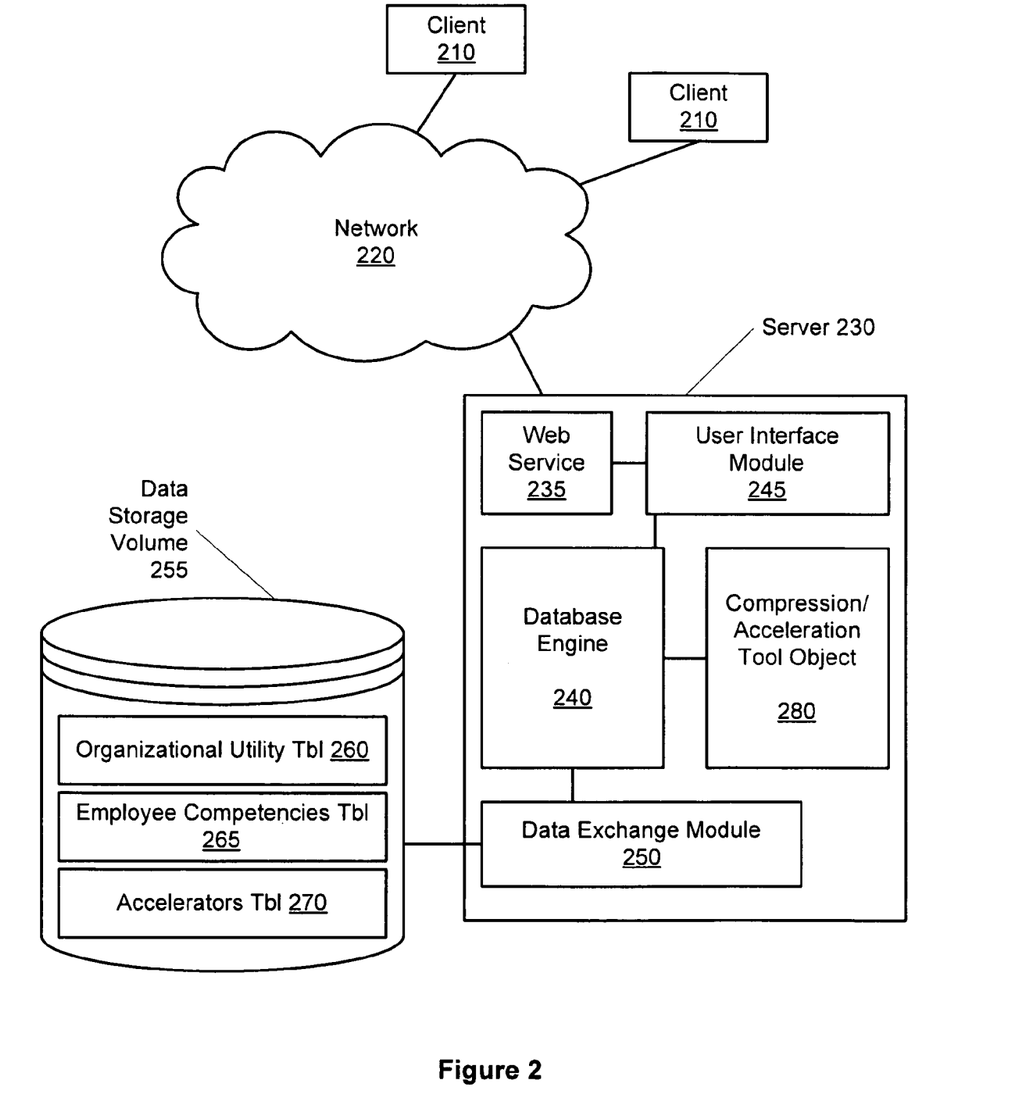
FIG. 2 is a simplified block diagram illustrating a network environment usable by embodiments of the present invention.

FIG. 2 is a simplified block diagram illustrating a network environment usable by embodiments of the present invention. Client computers 210 are coupled via a network 220 to a server computer 230. Client computers 210 and server computer 230 can be embodied by a variety of specific types of computers or specialized processors that permit a user to access, modify and view data. Network 220 can include one or more of a local area network, metro area network, wide area network, and the like. Network 220 can be further implemented by a variety of network protocols, including, for example, Ethernet, TCP/IP, Sonet/SDH, and the like. Embodiments of the present invention are not limited by the type of network or network protocol implemented in network 220. Server 230 has a network interface of an appropriate type to couple to the implemented network and configured to communicate with clients 210 using appropriate protocols.

Server 230 provides a user of a client 210 or of server 230 with access to information used and manipulated by embodiments of the present invention. Server 230 can provide a web service 235 that communicates with clients 210 using one or more messaging protocols via the network interface. Web service 235 can communicate with a user interface module 245 that can provide, for example, applets, views, charts and reports associated with one or more applications, including embodiments of the present invention. Various types of clients can be supported via user interface module 245 and web service 235. The various types of clients (e.g., clients 210) can include traditionally connected clients, remote clients, thin clients, Java thin clients or non-Windows-based operating systems, HTML clients over the Internet, and the like.

User interface module 245 can provide communication with a database engine 240. Database engine 240 can be designed to provide access to a variety of information stored in tables associated with the database via a data exchange module 250. Data exchange module 250 can be designed to handle interactions with one or more specific target databases or data sources and to provide an interface between database engine 240 and the underlying data sources (e.g., tables stored in data storage volume 255).

Data storage volume 255 is a physical or logical volume for storing data used by embodiments of the present invention. As illustrated, data storage volume 255 stores an organizational utility table 260, an employee competencies table 265, and an accelerators table 270. These tables are used by database engine 240 in conjunction with a compression/acceleration tool object 280 that implements embodiments of the present invention. Embodiments of the present invention are not limited to the illustrated division of modules and devices, or to any specific arrangement of modules.

Figure 3:
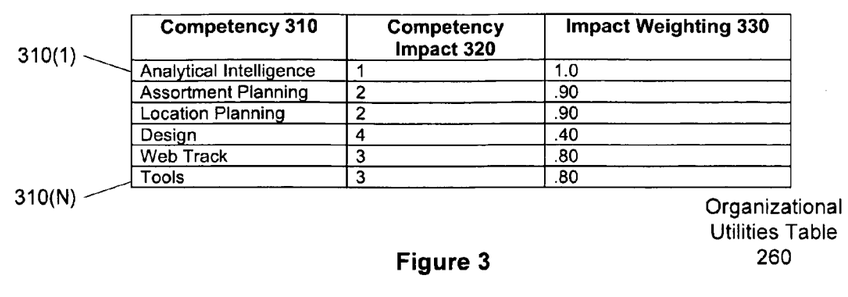
FIG. 3 illustrates an example of an organizational utilities table 260 usable by embodiments of the present invention.

FIG. 3 illustrates an example of an organizational utilities table 260 usable by embodiments of the present invention. As shown, organizational utilities table 260 includes columns for competencies (310), competency impact (320) and impact weighting (330). Examples of types of competencies and impact assessments and associated weightings are illustrated in the example table (340(1)-(N)). As discussed above, the competencies listed in the organizational utilities table are those determined to be of interest to the business entity for purposes of evaluating employee value to the business entity. The associated competency impact values can be included by an administrator or management-level employee who is conducting the employee evaluations. The product impact values should be determined and consistently applied across the business entity. Impact weighting values 330 can then be calculated based upon the associated product impact values. In order to assist the database administrator or the manager conducting the employee evaluation in the entry of competencies and their associated product impact values, embodiments of the present invention can provide administrative level user interfaces via user interface module 245. An alternative embodiment of an organizational utilities table can provide associations between competencies and competency impact and then also provide a lookup table of competency impact values with associated impact weighting.

Figure 4:
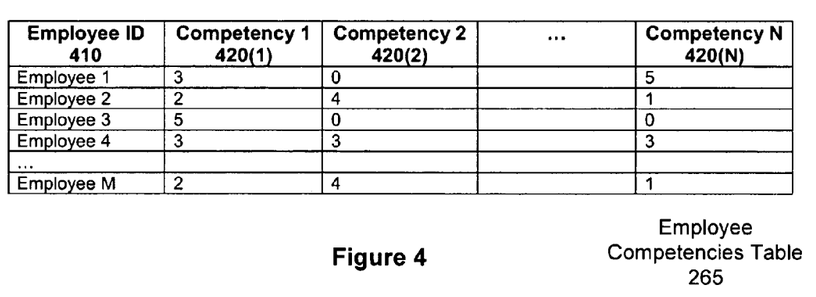
FIG. 4 illustrates an example of employee competencies table 265 usable by embodiments of the present invention.

FIG. 4 illustrates an example of employee competencies table 265 usable by embodiments of the present invention. As illustrated, employee competencies table 265 includes an employee column (410), and a set of competency columns (420(1)-(N)). Employee competencies table 265 stores evaluated competency levels for each competency of interest for each evaluated employee. Competencies 420(1)-(N) correspond to competencies 310(1)-(N) stored in organizational utilities table 260. As discussed above, an employee's supervisor evaluates each competency level for the employee based upon a strict set of criteria. Once evaluated, a record for the employee can be stored in employee competency table 265 with an employee identifier in employee column 410 and the evaluated, raw scalar competency levels in each corresponding competency column 420(1)-(N).

Figure 5:
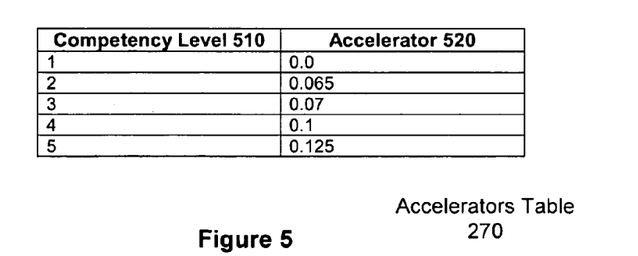
FIG. 5 illustrates an example of an accelerators table usable by embodiments of the present invention.

FIG. 5 illustrates an example of an accelerators table usable by embodiments of the present invention. As illustrated, accelerator table 270 includes a competency level column (510) and a accelerator column (520). As discussed above, the accelerators in accelerator table 270 are associated with an employee's secondary competencies. The accelerators for each secondary competency of an employee can be aggregated and subsequently used to determine the employee's overall domain competency level. Accelerator table 270 can be used as a lookup table for determining an employee's applicable accelerators prior to performing the overall domain competency calculation. The values for the accelerators shown in FIG. 5 are an example following those values discussed above.

Figure 6:
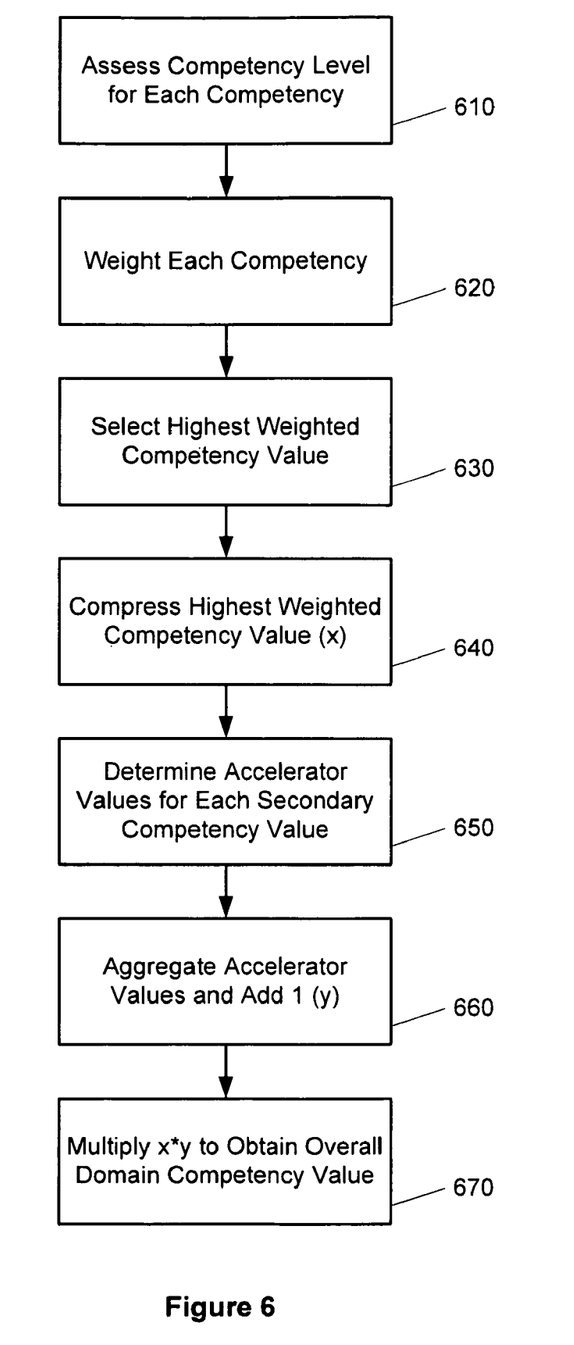
FIG. 6 is a simplified flow diagram illustrating a process performed by embodiments of the present invention.

FIG. 6 is a simplified flow diagram illustrating a process performed by embodiments of the present invention. Initially, an assessment of competency levels for each competency is performed by a supervisor of each employee of interest (610). As discussed above, such an assessment is performed according to a set of strict criteria for each competency being evaluated. Raw scalar values of these assessments can then be entered into employee competency table 265 through the use of a user interface provided by, for example, user interface module 245. The user interface can provide, for example, a set of drop-down lists for each competency and available criteria with explanation. The person entering the evaluated competency information can select the appropriate competencies and appropriate competency levels for each employee of interest. Database engine 240 can then provide the competency information to the employee competencies table 265 stored on data storage volume 255.

The weighting for each competency is then applied against the entered level of competency for an employee (620). The applicable weightings can be provided from organizational utility table 260, as discussed above. The weightings, which can be representative of a percentage value, are applied to the entered competency levels by multiplying the entered competency level by the corresponding weighting for the selected competency to arrive at adjusted competency values. Adjusted competency values for each employee can either be temporarily stored in memory accessible by database engine 240 or compression/acceleration tool object 280 or, alternatively, stored in data storage volume 255 either in additional columns of employee competencies table 265 or an additional table providing the adjusted competency values. In an alternative embodiment, competency weightings can be applied to competency levels as the competency levels are entered by the user. Then the competency values can be directly stored in competencies table 265.

A highest adjusted competency value is then determined and selected (630). This highest adjusted competency value is compressed according to a selected formula, as discussed above (640). As discussed above, such compression is used to level an initial assessment of an employee's strongest skill and allows for the application of the additional considerations for secondary skills. The specific compression formula used by a business entity for compression is determined based upon the business entity's needs and expectations for the results of the domain competency evaluator, as discussed above. The result of this compression (the compressed highest competency value) can then be stored in a memory accessible by database engine 240 or compression/acceleration tool object 280.

For each secondary adjusted competency value (e.g., competencies other than the highest adjusted competency value), accelerator values are determined (650). Such accelerator values are determined by applying accelerators found in accelerator lookup table 270 to the adjusted secondary competency values. The accelerator values for each of the secondary competencies are aggregated and the aggregated total is added to 1 (660). This value is then used as a multiplier for the compressed highest competency value (670). The resulting value is an overall domain competency value for the employee.

The resulting overall domain competency value can then be used to determine a relative value to the business entity of an employee's set of competencies as against other employees. The overall domain competency value for each employee can be stored in association with the employee's identifier in, for example, employee competencies table 265. Once overall domain competency values are determined for each employee of interest, results can be provided to a client via an appropriate user interface. A determination of what type of user interface display is most appropriate can be dependent upon the type of analysis being performed of the employee competencies. For example, user interface displays can include ordered lists, histograms and scatter diagrams. User interface displays can also include various screening criteria which can be applied at view time to permit examination of subsets of data in light of skill sets, competency levels, business units and other population attributes. Such user interface displays can be transmitted from server 230 to clients 210 for display to users thereon. In addition, data streams can be formulated for export to other applications, such as, for example, human resource management, statistical analysis and spreadsheet applications.

As discussed above, the implementation of compression and acceleration performed by embodiments of the present invention can aid in a consistent evaluation of competencies of employees across a business entity. Such an evaluation can aid in determining compensation increases, promotions, hirings and firings of employees. As discussed above, the present invention is not limited to the specific formulas and values presented. A business entity can examine its own needs and expectations to determine appropriate formulas for compression and organizational utility weightings for competencies.

An Example Computing And Network Environment

As shown above, the present invention can be implemented using a variety of computer systems and networks. An example of one such computing and network environment is described below with reference to FIGS. 7 and 8.

Figure 7:
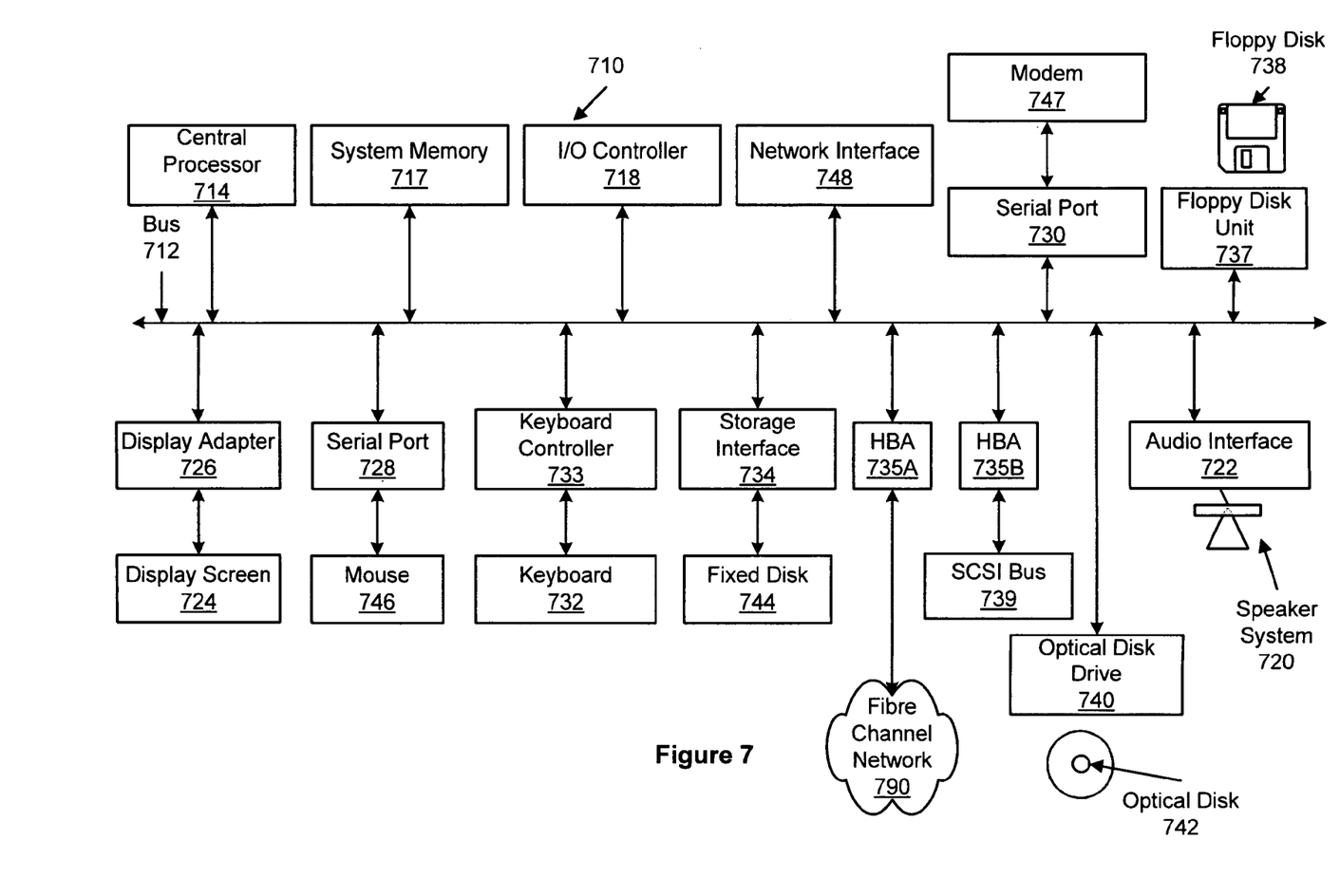
FIG. 7 illustrates a block diagram of a computer system suitable for implementing aspects of the present invention.

FIG. 7 depicts a block diagram of a computer system 710 suitable for implementing aspects of the present invention (e.g., clients 210, and server 230). Computer system 710 includes a bus 712 which interconnects major subsystems of computer system 710, such as a central processor 714, a system memory 717 (typically RAM, but which may also include ROM, flash RAM, or the like), an input/output controller 718, an external audio device, such as a speaker system 720 via an audio output interface 722, an external device, such as a display screen 724 via display adapter 726, serial ports 728 and 730, a keyboard 732 (interfaced with a keyboard controller 733), a storage interface 734, a floppy disk drive 737 operative to receive a floppy disk 738, a host bus adapter (HBA) interface card 735A operative to connect with a Fibre Channel network 790, a host bus adapter (HBA) interface card 735B operative to connect to a SCSI bus 739, and an optical disk drive 740 operative to receive an optical disk 742. Also included are a mouse 746 (or other point-and-click device, coupled to bus 712 via serial port 728), a modem 747 (coupled to bus 712 via serial port 730), and a network interface 748 (coupled directly to bus 712).

Bus 712 allows data communication between central processor 714 and system memory 717, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 710 are generally stored on and accessed via a computer-readable medium, such as a hard disk drive (e.g., fixed disk 744), an optical drive (e.g., optical drive 740), a floppy disk unit 737, or other storage medium. Additionally, applications can be in the form of electronic signals modulated in accordance with the application and data communication technology when accessed via network modem 747 or interface 748.

Storage interface 734, as with the other storage interfaces of computer system 710, can connect to a standard computer-readable medium for storage and/or retrieval of information, such as a fixed disk drive 744. Fixed disk drive 744 may be a part of computer system 710 or may be separate and accessed through other interface systems. Modem 747 may provide a direct connection to a remote server via a telephone link or to the Internet via an internet service provider (ISP). Network interface 748 may provide a direct connection to a remote server via a direct network link to the Internet via a POP (point of presence). Network interface 748 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 7 need not be present to practice the present invention. The devices and subsystems can be interconnected in different ways from that shown in FIG. 7. The operation of a computer system such as that shown in FIG. 7 is readily known in the art and is not discussed in detail in this application. Code to implement the present invention can be stored in computer-readable storage media such as one or more of system memory 717, fixed disk 744, optical disk 742, or floppy disk 738. The operating system provided on computer system 710 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 8:
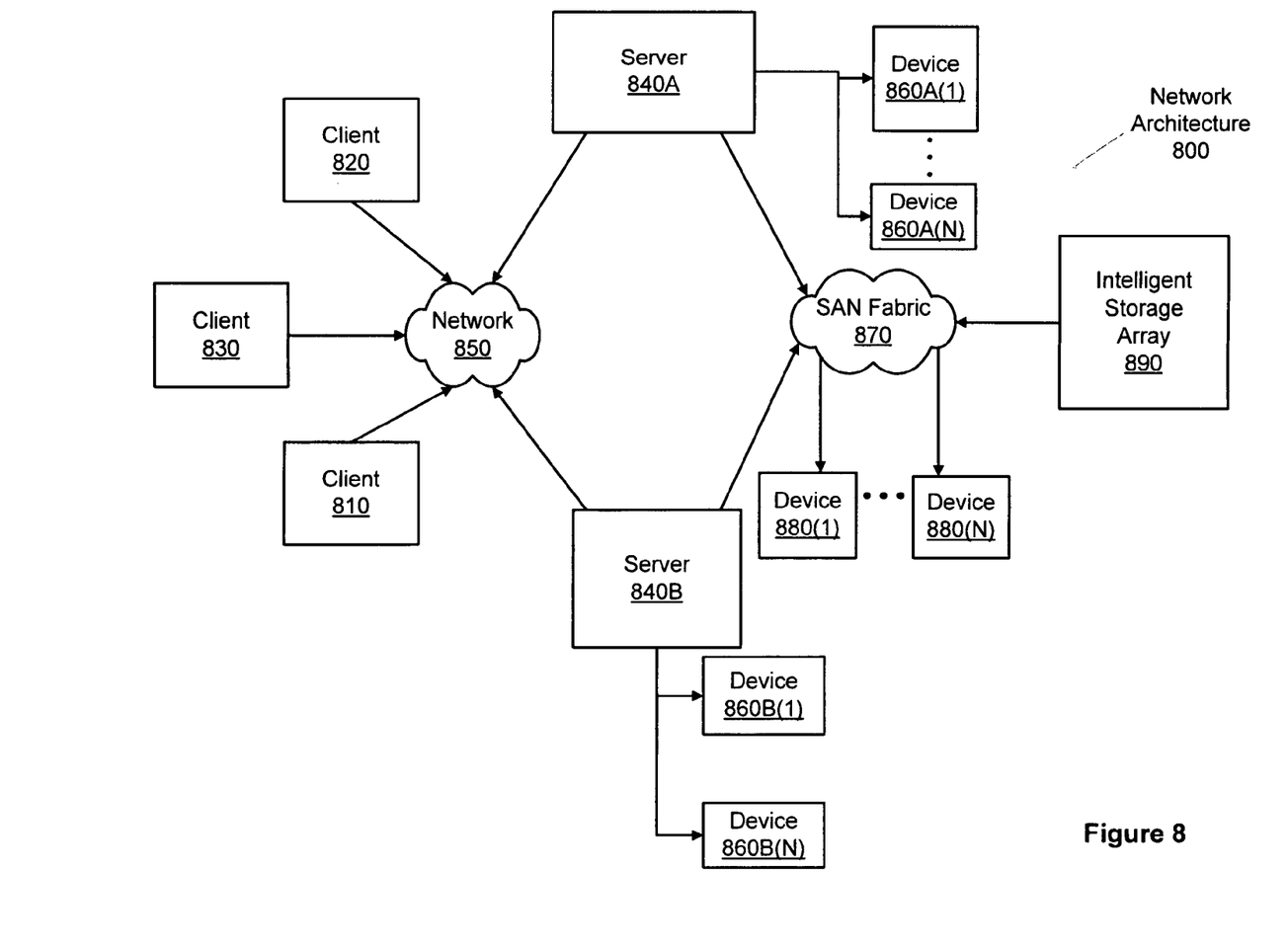
FIG. 8 illustrates a block diagram of a network architecture suitable for implementing aspects of the present invention.

FIG. 8 is a block diagram depicting a network architecture 800 in which client systems 810, 820 and 830, as well as storage servers 840A and 840B (any of which can be implemented using computer system 710), are coupled to a network 850. Storage server 840A is further depicted as having storage devices 860A(1)-(N) directly attached, and storage server 840B is depicted with storage devices 860B(1)-(N) directly attached. Storage servers 840A and 840B are also connected to a SAN fabric 870, although connection to a storage area network is not required for operation of the invention. SAN fabric 870 supports access to storage devices 880(1)-(N) by storage servers 840A and 840B, and so by client systems 810, 820 and 830 via network 850. Intelligent storage array 890 is also shown as an example of a specific storage device accessible via SAN fabric 870.

With reference to computer system 710, modem 747, network interface 748 or some other method can be used to provide connectivity from each of client computer systems 810, 820 and 830 to network 850. Client systems 810, 820 and 830 are able to access information on storage server 840A or 840B using, for example, a web browser or other client software (not shown). Such a client allows client systems 810, 820 and 830 to access data hosted by storage server 840A or 840B or one of storage devices 860A(1)-(N), 860B(1)-(N), 880(1)-(N) or intelligent storage array 890. FIG. 8 depicts the use of a network such as the Internet for exchanging data, but the present invention is not limited to the Internet or any particular network-based environment.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of computer system 710). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof, including the specialized system illustrated in FIG. 9.

The present invention has been described in the context of fully functional computer systems; however, those skilled in the art will appreciate that the present invention is capable of being distributed as a program product in a variety of forms, and that the present invention applies equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A computer-implemented method comprising:
   determining, using a processor node, a highest competency value from a set of competencies associated with an identifier of a member of a business entity, wherein
      each competency value is on a competency scale from a minimum competency value to a maximum competency value,
      the identifier and associated set of competencies are stored as an entry in a first table, and
      the first table is accessible to the processor node performing said determining;
   compressing the highest competency value, wherein
      said compressing maps the highest competency value to an adjusted competency scale;
   generating an accelerator multiplier for the highest competency value from one or more values of remaining competencies of the set of competencies;
   generating, using the processor node, an overall domain competency value by multiplying the compressed highest competency value by the accelerator multiplier; and
   displaying the overall domain competency value on a display coupled to the processor node.

2. The computer-implemented method of claim 1 wherein the set of competencies is generated by the method further comprising:
   receiving one or more raw competency values for corresponding competencies in the set of competencies;
   weighting each raw competency value according to a corresponding organizational utility value for the competency to generate a weighted competency value; and
   storing each weighted competency value in the table entry.

3. The computer-implemented method of claim 2 wherein each organizational utility value is a predetermined percentage multiplier corresponding to a value of the associated competency to the business entity.

4. The computer-implemented method of claim 3 further comprising:
   storing entries comprising identifiers of each competency with associated organizational utility values in a second table.

5. The computer-implemented method of claim 1 further comprising:
   performing said compressing using a mapping such that the adjusted competency scale has a reduced maximum competency value, wherein
      the mapping comprises one of
         a lookup table, or
         a formula-based curve.

6. The computer-implemented method of claim 5 wherein the formula-based curve comprises an arc-based curve.

7. The computer-implemented method of claim 5 wherein the formula-based curve comprises a natural logarithm-based curve.

8. The computer-implemented method of claim 5 wherein the formula-based curve comprises a linear reduction.

9. The computer-implemented method of claim 1 wherein said generating the accelerator multiplier for the highest competency value from one or more values of remaining competencies of the set of competencies comprises:
   for each remaining competency of the set of competencies,
      determining an accelerator value associated with a competency value of the competency, and
      adding the accelerator value to a sum of accelerator values for each other remaining competency in the set of competencies.

10. The computer-implemented method of claim 9 wherein said determining the accelerator value associated with a competency value of the competency comprises:

comparing the competency value with competency values stored in a third table storing competency values and associated accelerator values, and using the accelerator value associated with a matching competency value stored in the third table.

11. An apparatus comprising:
a network interface, coupled to a network, and configured to receive a raw set of competencies associated with a member of a business entity from a remote node;
a data exchange module, coupled to a database having an associated data storage volume, and configured to exchange data with the database;
a processor, coupled to the network interface and the data exchange module, and configured to execute a compression/acceleration tool object configured to
weight each raw competency value according to a corresponding organizational utility value for the competency to generate a weighted competency value,
determine a highest competency value from the set of weighted competencies associated with an identifier of the member of the business entity, wherein
each competency value is on a competency scale from a minimum competency value to a maximum competency value, and
the identifier and associated set of competencies are stored as an entry in a first table of the database,
compress the highest competency value, wherein
compressing the highest competency value maps the highest competency value to an adjusted competency scale,
generate an accelerator multiplier for the highest competency value from one or more values of remaining competencies of the set of competencies;
generate an overall domain competency value by multiplying the compressed highest competency value by the accelerator multiplier; and
a display, coupled to the processor, and configured to display the overall domain competency value.

12. The apparatus of claim 11 wherein each organizational utility value is a predetermined percentage multiplier corresponding to a value of the associated competency to the business entity.

13. The apparatus of claim 12 wherein the processor is further configured to:
store entries comprising identifiers of each competency with associated organizational utility values in a second table of the database.

14. The apparatus of claim 11 wherein the processor is further configured to:
perform said compressing using a mapping such that the adjusted competency scale has a reduced maximum competency value, wherein
the mapping comprises one of
a lookup table, or
a formula-based curve.

15. The apparatus of claim 11 wherein the processor being configured to generate the accelerator multiplier for the highest competency value from one or more values of remaining competencies of the set of competencies comprises the processor being further configured to:
for each remaining competency of the set of competencies,
determine an accelerator value associated with a competency value of the competency, and
add the accelerator value to a sum of accelerator values for each other remaining competency in the set of competencies.

16. The apparatus of claim 15 wherein the processor being configured to determine the accelerator value associated with a competency value of the competency comprises the processor being further configured to:
compare the competency value with competency values stored in a third table of the database storing competency values and associated accelerator values, and
use the accelerator value associated with a matching competency value stored in the third table.

17. A computer-readable non-transitory storage medium storing instructions executable by a processor, the instructions comprising:
a first set of instructions configured to determine a highest competency value from a set of competencies associated with an identifier of a member of a business entity, wherein
each competency value is on a competency scale from a minimum competency value to a maximum competency value,
the identifier and associated set of competencies are stored as an entry in a first table, and
the first table is accessible to the processor;
a second set of instructions configured to compress the highest competency value, wherein
said compressing maps the highest competency value to an adjusted competency scale;
a third set of instructions configured to generate an accelerator multiplier for the highest competency value from one or more values of remaining competencies of the set of competencies;
a fourth set of instructions configured to generate an overall domain competency value by multiplying the compressed highest competency value by the accelerator multiplier; and
a fifth set of instructions configured to display the overall domain competency value on a display coupled to the processor.

18. The computer-readable non-transitory storage medium of claim 17 storing instructions to generate the set of competencies, the instructions further comprising:
a sixth set of instructions configured to receive one or more raw competency values for corresponding competencies in the set of competencies;
a seventh set of instructions configured to weight each raw competency value according to a corresponding organizational utility value for the competency to generate a weighted competency value; and
an eighth set of instructions configured to store each weighted competency value in the table entry.

19. The computer-readable non-transitory storage medium of claim 17 storing instructions further comprising:
a sixth set of instructions configured to perform said compressing using a mapping such that the adjusted competency scale has a reduced maximum competency value, wherein
the mapping comprises one of
a lookup table, or
a formula-based curve.

20. The computer-readable non-transitory storage medium of claim 17 wherein the third set of instructions further comprises instructions executable for each remaining competency of the set of competencies, the instructions comprising:
a sixth set of instructions configured to determine an accelerator value associated with a competency value of the competency, and
a seventh set of instructions configured to add the accelerator value to a sum of accelerator values for each other remaining competency in the set of competencies

* * * * *

UNITED STATES PATENT AND TRADEMARK OFFICE
CERTIFICATE OF CORRECTION

PATENT NO. : 8,332,261 B2  
APPLICATION NO. : 12/475118  
DATED : December 11, 2012  
INVENTOR(S) : Gillam et al.

Page 1 of 1

It is certified that error appears in the above-identified patent and that said Letters Patent is hereby corrected as shown below:

On front page, in column 2, under "Other Publications", line 3, delete "reliabilty" and insert -- reliability --, therefor.

In column 6, line 27, delete "4competencies" and insert -- 4 competencies --, therefor.

In column 16, line 63, in Claim 20, delete "competencies" and insert -- competencies. --, therefor.

Signed and Sealed this  
Twelfth Day of March, 2013

Teresa Stanek Rea  
*Acting Director of the United States Patent and Trademark Office*